(12) United States Patent
Namba

(10) Patent No.: US 12,157,504 B2
(45) Date of Patent: Dec. 3, 2024

(54) AUTOMATIC DRIVING ASSIST SYSTEM

(71) Applicant: SUBARU CORPORATION, Tokyo (JP)

(72) Inventor: Ryosuke Namba, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 97 days.

(21) Appl. No.: 16/838,081

(22) Filed: Apr. 2, 2020

(65) Prior Publication Data

US 2020/0361495 A1 Nov. 19, 2020

(30) Foreign Application Priority Data

May 15, 2019 (JP) .................................. 2019-092329

(51) Int. Cl.
  *B60W 60/00* (2020.01)
  *G01C 21/36* (2006.01)
  *G06V 20/56* (2022.01)

(52) U.S. Cl.
  CPC .... *B60W 60/0059* (2020.02); *B60W 60/0015* (2020.02); *G01C 21/3617* (2013.01); *G06V 20/588* (2022.01)

(58) Field of Classification Search
  CPC .......... B60W 60/0059; B60W 60/0015; G01C 21/3617; G06K 9/00798
  See application file for complete search history.

(56) References Cited

U.S. PATENT DOCUMENTS

| | | | |
|---|---|---|---|
| 2005/0049900 A1* | 3/2005 | Hirose | G07F 17/16 705/6 |
| 2015/0317900 A1* | 11/2015 | Tashiro | G01C 21/3844 701/117 |
| 2018/0222422 A1* | 8/2018 | Takae | G08G 1/166 |
| 2019/0084564 A1 | 3/2019 | Miura et al. | |
| 2019/0130742 A1* | 5/2019 | Tokunaga | G08G 1/09 |
| 2019/0202473 A1* | 7/2019 | Kaji | B60W 50/12 |
| 2019/0217883 A1* | 7/2019 | Ozawa | B62D 6/002 |

(Continued)

FOREIGN PATENT DOCUMENTS

JP 2019-053596 A 4/2019

*Primary Examiner* — Jelani A Smith
*Assistant Examiner* — Toya Pettiegrew
(74) *Attorney, Agent, or Firm* — Rimon P.C.

(57) ABSTRACT

The automatic driving assist system includes a traveling information acquirer that acquires vehicle width information, passing date and time, and position information when passing the measurement point, on preceding vehicles, from the preceding vehicle passing through the measurement point for each measurement, a traveling environment information acquirer that acquires traveling environment information at each measurement point, a calculator that acquires a travelable width at the measurement point based on information of the preceding vehicles and the traveling environment information, and a determiner that determines whether the own vehicle can travel to pass through the measurement point by automatic driving by comparing the travelable width with an own-vehicle travelable width. The calculator aggregates the position information and the vehicle width information acquired during a period from when the own vehicle is expected to pass the measurement point until before a predetermined time, to acquire the travelable width.

10 Claims, 12 Drawing Sheets

(56) References Cited

U.S. PATENT DOCUMENTS

| | | | |
|---|---|---|---|
| 2019/0294167 A1* | 9/2019 | Kutila | G08G 1/091 |
| 2019/0384294 A1* | 12/2019 | Shashua | G06V 20/584 |
| 2020/0031335 A1* | 1/2020 | Ohmura | B60W 50/082 |
| 2020/0086866 A1* | 3/2020 | Miura | B60W 30/0956 |
| 2020/0211219 A1* | 7/2020 | Yamazaki | G01S 17/87 |
| 2020/0279481 A1* | 9/2020 | Kondo | G01C 21/3415 |
| 2020/0309533 A1* | 10/2020 | Young | G06V 10/993 |
| 2021/0163010 A1* | 6/2021 | Takabayashi | B60W 40/02 |

* cited by examiner

FIG. 2

PROBE INFORMATION

| |
|---|
| VEHICLE ID |
| VEHICLE INFORMATION (VEHICLE TYPE, VEHICLE WIDTH, ⋯) |
| PASSING DATE AND TIME |
| PASSING POSITION (LATITUDE AND LONGITUDE) |
| VEHICLE SPEED |
| TRAVELING DIRECTION |
| TRAVELING ROUTE |
| ⋮ |

AUTOMATIC DRIVING ASSIST SYSTEM

CROSS-REFERENCE TO RELATED APPLICATIONS

The present application claims priority from Japanese Patent Application No. 2019-92329 filed on May 15, 2019, the entire contents of which are hereby incorporated by reference.

BACKGROUND

The technology relates to an automatic driving assist system configured to continue automatic driving when a travelable width, which is a width of a vehicle that can travel, is acquired by aggregating position information and width information of preceding vehicles that have passed a measurement point, is equal to or larger than an own-vehicle travelable width of an own vehicle.

A driving assist unit mounted on a vehicle map-matches an own vehicle position with a high-accuracy road map (dynamic map) based on position information received from a positioning satellite such as a global navigation satellite system (GNSS) satellite represented by a GPS satellite. When an occupant (mainly a driver) sets a destination on the high-accuracy road map, the driving assist unit builds a traveling route connecting an own vehicle position and the destination.

Then, a target travel path for causing the own vehicle to travel along the traveling route is set up to several kilometers ahead of the own vehicle. The high-accuracy road map stores road information necessary for automatic driving. The road information includes lane number information (two-lane, three-lane, and the like), road width information, curve curvature information, and the like. The driving assist unit sets a target travel path for causing the own vehicle to travel in a center of a selected traveling lane based on the road information on the high-accuracy road map.

In a case where an on-board peripheral monitoring sensor such as a camera, a laser scanner, or the like is mounted on the own vehicle, the driving assist unit that recognizes lane markers marking the left and right of the traveling lane by the on-board peripheral monitoring sensor, detects a road shape, and guides the own vehicle to travel in the center of the traveling lane is also known. A redundant system is built by this driving assist control and the automatic driving control by matching the high-accuracy road map information with the own vehicle position information.

Therefore, for instance, when a lane line or a lane on a road surface cannot be detected due to accumulated snow, the redundancy is lowered, so that the automatic driving is canceled, and the driving is taken over by a manual driving. On the other hand, for instance, Japanese Unexamined Patent Application Publication (JP-A) No. 2019-53596 discloses a technique for comparing a travelable road width (detected width) detected by an on-board peripheral monitoring sensor (detecting unit) with a road width (specified width) acquired from the high-accuracy road map information, and for continuing automatic driving based on the detected width when the detected width is narrower than the specified width.

SUMMARY

In an aspect of the technology, an automatic driving assist system includes a traveling information acquirer configured to acquire vehicle width information, passing date and time, and position information when passing the measurement point, on preceding vehicles, from the preceding vehicle passing through the measurement point for each measurement point set in advance on a road, a traveling environment information acquirer configured to acquire traveling environment information at each measurement point, a travelable width calculator configured to acquire a travelable width at the measurement point based on each information of the preceding vehicles acquired by the traveling information acquirer and the traveling environment information acquired by the traveling environment information acquirer, and an own vehicle traveling possibility determiner configured to determine whether the own vehicle is capable of traveling to pass through the measurement point by automatic driving by comparing the travelable width calculated by the travelable width calculator with an own-vehicle travelable width of the own vehicle. The travelable width calculator aggregates the position information and the vehicle width information acquired by the traveling information acquirer during a time period from a time point when the own vehicle is expected to pass the measurement point until before a predetermined aggregation time, to acquire the travelable width.

In an aspect of the technology, an automatic driving assist system includes a circuitry, the circuitry being configured to: acquire vehicle width information, passing date and time, and position information when passing the measurement point, on preceding vehicles, from the preceding vehicles passing through the measurement point, for each measurement point set in advance on a road, acquire traveling environment information at the each measurement point, acquire a travelable width at the measurement point based on each information of the preceding vehicles and the traveling environment information acquired, and determine whether the own vehicle is capable of traveling to pass through the measurement point by automatic driving by comparing the travelable width calculated by the travelable width calculator with an own-vehicle travelable width of the own vehicle. The travelable width is acquired by aggregating the position information and the vehicle width information acquired by the traveling information acquirer during a time period from a time point when the own vehicle is expected to pass the measurement point until before a predetermined aggregation time.

BRIEF DESCRIPTION OF THE DRAWINGS

FIG. 2 is an explanatory diagram illustrating an example of probe information transmitted from a probe vehicle.

DETAILED DESCRIPTION

Figure 1:
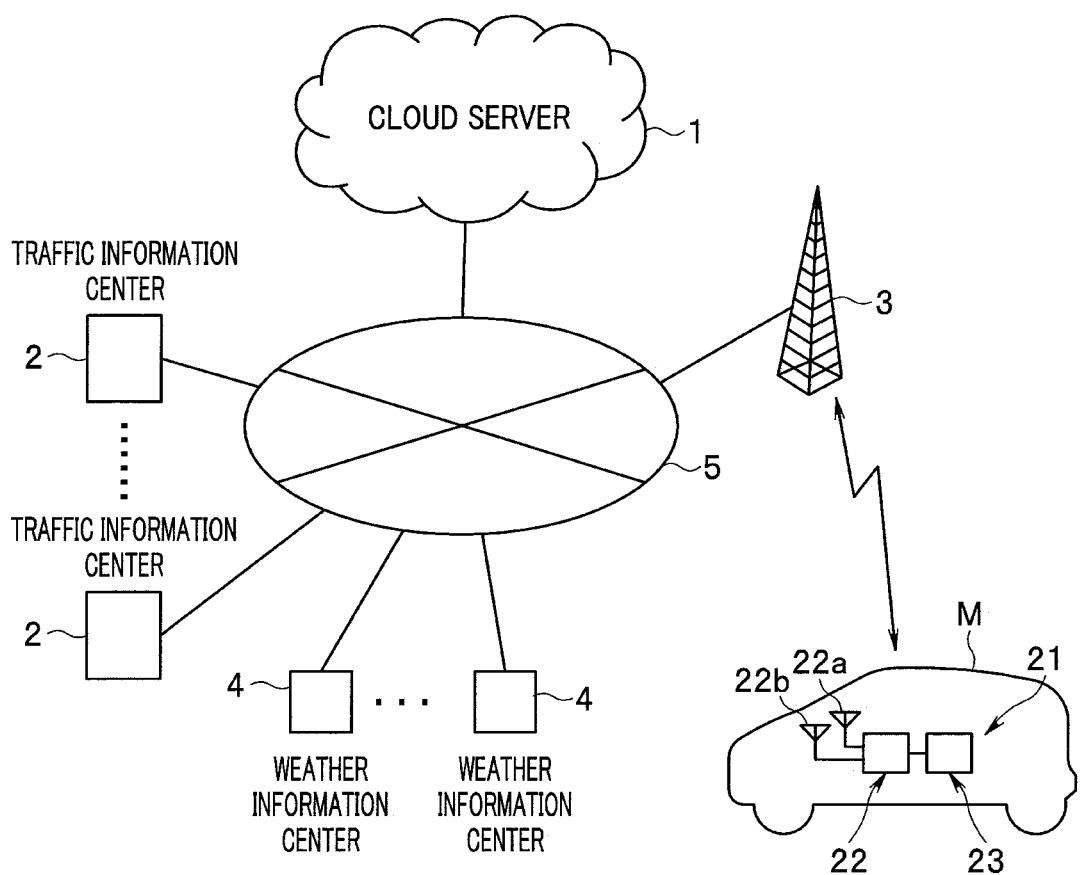
FIG. 1 is a schematic configuration diagram of an entire automatic driving assist system.

A description is given below of some embodiments of the technology with reference to the accompanying drawings. Note that the following description is directed to illustrative instances of the technology and not to be construed as limiting to the technology. Factors including, without limitation, numerical values, shapes, materials, components, positions of the components, and how the components are coupled to each other are illustrative only and not to be construed as limiting to the technology. Further, elements in the following embodiments which are not recited in a most-generic independent claim of the disclosure are optional and may be provided on an as-needed basis. The drawings are schematic and are not intended to be drawn to scale.

When a vehicle on which a driving assist unit is mounted travels by automatic driving in a region with a lot of snowfall, in such a situation that a large amount of accumulated snow on a road is flown in the air due to strong wind or the like, the driving visibility is extremely limited, so that it becomes difficult to detect a road shape by an on-board peripheral monitoring sensor (detection unit) such as a camera, a laser scanner, or the like and the redundancy is considerably lowered. Therefore, it is difficult to continue the automatic driving as disclosed in JP-A No. 2019-53596.

On the other hand, in a traveling environment with few outdoor obstacles, an own vehicle position can be estimated based on a signal from a positioning satellite such as a GNSS satellite, so that automatic driving control by high-accuracy road map information and own vehicle position information estimated based on the signal from the positioning satellite is possible.

However, in a region with a lot of snowfall, a snow-removed area becomes provisional lanes. For instance, even on a three-lane road, as a result of snow removal, snow walls are formed on both sides of the road so that travelable lanes become two, which lanes become provisional traveling lanes. The high-accuracy road map information is measured when there is no accumulated snow, and does not always match the traveling lane during snowfall. Thus, it becomes difficult to cause the own vehicle to travel by automatic driving by following the high-accuracy road map, then the automatic driving is shifted to a manual operation to be taken over by a driver.

Even when lanes of a road from which snow has been removed do not match actual lanes, if automatic driving can be continued as much as possible, a burden on a driver can be greatly reduced.

Accordingly, it is desirable to provide an automatic driving assist system capable of reducing a burden on a driver by appropriately determining whether an own vehicle can pass and continuing the automatic driving, even in a situation where the on-board peripheral monitoring sensor can not be used due to snowfall or strong wind in a region where there is a lot of snowfall.

Hereinafter, an embodiment of the technology will be described with reference to the drawings. An automatic driving assist system illustrated in FIG. 1 includes a cloud server 1, traffic information centers 2, a base station 3, and weather information centers 4, which are coupled to each other via the Internet 5. A driving assist unit 21 mounted on an own vehicle M, which acquires cloud information from the cloud server 1 via the base station 3, is also included in the automatic driving assist system.

Figure 10:
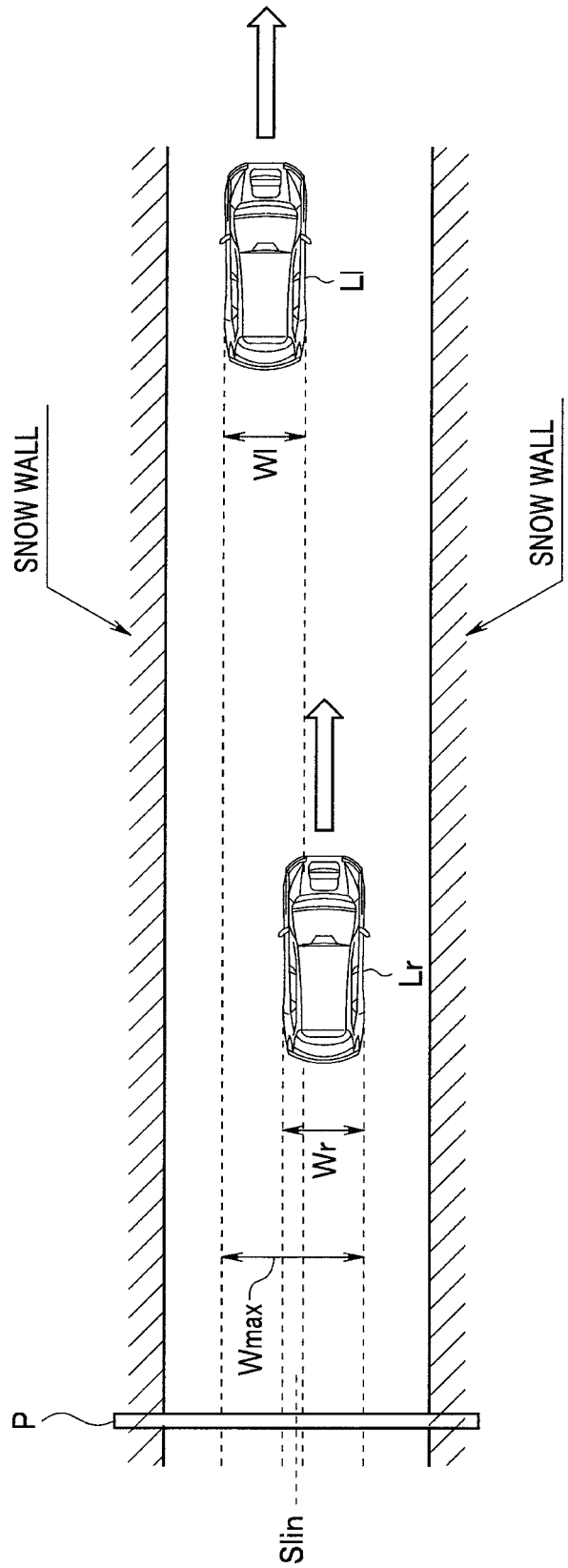
FIG. 10 is an explanatory diagram of a maximum traveling area to be set based on probe information from probe vehicles passing through a road measurement point set on a snow-removed road.
Figure 11:
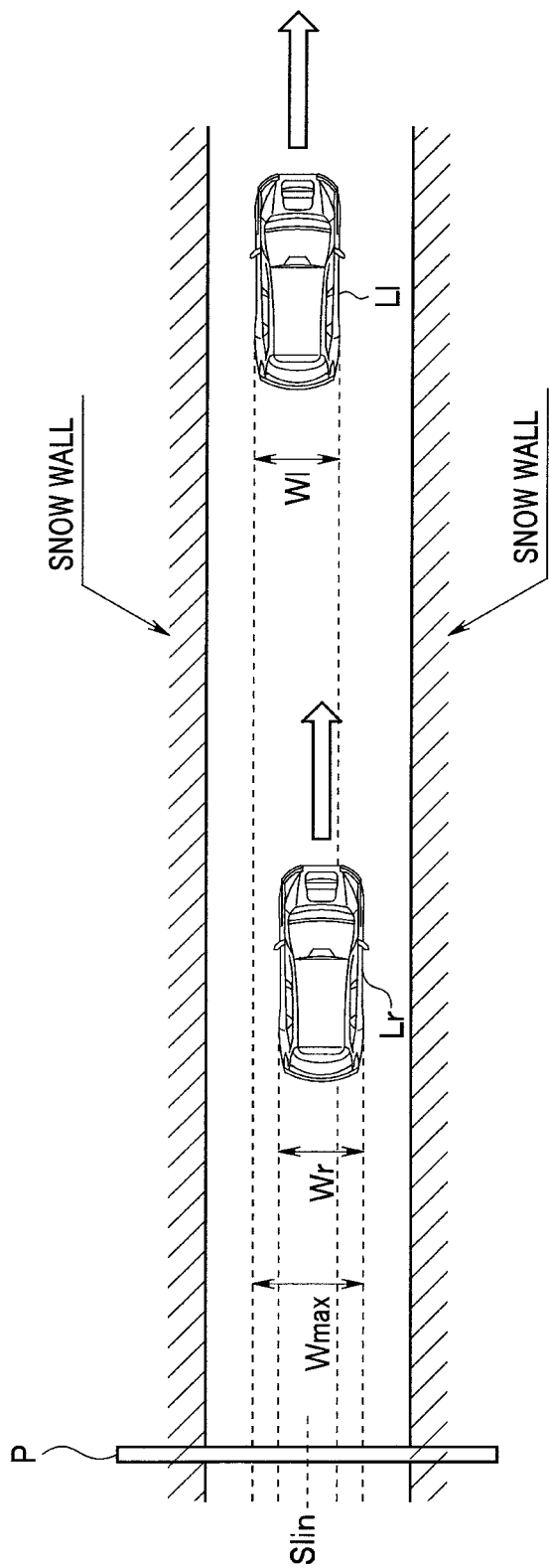
FIG. 11 is an explanatory diagram of the maximum traveling area corresponding to FIG. 10 when an amount of snowfall is large.

Each of the traffic information centers 2 is placed under jurisdiction of private or public institution, aggregates traffic information (for instance, the number of vehicles traveling in each section) which changes momentarily, environmental information, and probe information transmitted from probe vehicles L as preceding vehicles passing through a measurement point P (refer to FIG. 10 and FIG. 11) set in advance in each section, and delivers aggregated information as traffic information to the cloud server 1. For instance, the private traffic information center 2 collects probe information acquired from each of the contracted probe vehicles L, and transmits the collected probe information to the cloud server 1. In FIG. 10 and FIG. 11, a probe vehicle L1 traveling on the leftmost side and a probe vehicle Lr traveling on the rightmost side among the probe vehicles L that have traveled during a period from a predetermined time point prior to the current time point until the current time are representatively illustrated as the probe vehicles L.

FIG. 2 illustrates probe information transmitted from each probe vehicle L. As illustrated in the figure, the probe information includes a vehicle ID of the probe vehicle L, vehicle information (vehicle type, vehicle width, and the like), and passing date and time (year, month, day, and time point), a passing position (latitude and longitude), vehicle speed, and a traveling direction, as a history at the time when the probe vehicle L has passed when passing through the measurement point P. In addition, a traveling route and the like where the own vehicle advances are also transmitted as the probe information.

In the traffic information center 2 of the public institution, for instance, snow removal information (snow removal section, snow removal time point, and the like) of each region at the time of snowfall is aggregated and distributed to the cloud server 1.

On the other hand, each of the weather information centers 4 is placed under jurisdiction of private or public institution, and sequentially aggregates current snowfall amounts [cm/h] of each region and distributes aggregated information to the cloud server 1.

Figure 3:
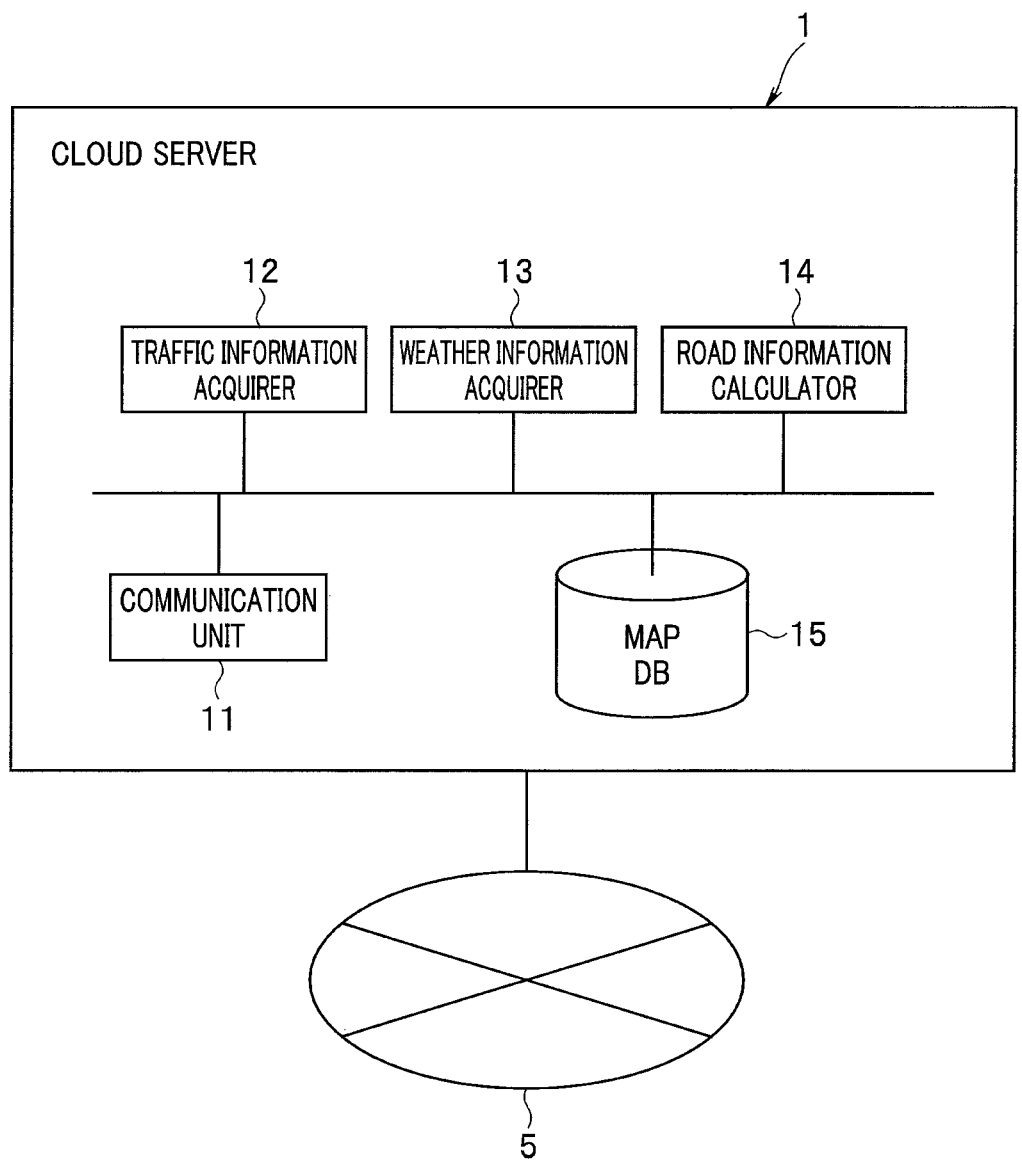
FIG. 3 is a schematic configuration diagram of a cloud server.

As illustrated in FIG. 3, the cloud server 1 includes a communication unit 11 for communicating with outside, a traffic information acquirer 12 serving as a traveling information acquirer, a weather information acquirer 13 serving as a traveling environment information acquirer, a road information calculator 14, a map database unit 15, and the like. The traffic information acquirer 12 acquires traffic information distributed from each traffic information center 2 via the communication unit 11, and aggregates traffic information at each measurement point P. The weather information acquirer 13 acquires weather information (including weather forecast information) distributed from each weather information center 4 via the communication unit 11, and aggregates weather information at each measurement point P.

The road information calculator 14 calculates road information indicating a state of a road surface at the measurement point P (see FIG. 10 and FIG. 11) during a period from a predetermined time point prior to the current time point until the current time point, based on the traffic information of each measurement point P aggregated by the traffic information acquirer 12 and the weather information acquired by the weather information acquirer 13. The traffic information at each measurement point P is processed in real time, and the road information of each measurement point P set in a global dynamic map stored in the map database unit 15 is sequentially updated.

The global dynamic map has a four-layer structure in which additional map information necessary for assisting the automatic traveling is superimposed on a static information layer which is a lowermost layer as a base. The static information layer is a base information layer positioned at the lowermost layer, in which as high-accuracy three-dimensional map information, static information with minimal change such as position information of the measurement point P, road information indicating a state of a road surface in each section, lane information, intersection information, three-dimensional structure, permanent regulation information, and the like is stored.

The additional map information superimposed on the static information layer is classified into three layers, and has a quasi-static information layer, a quasi-dynamic information layer, and a dynamic information layer in this order from the lowest layer. Each layer is classified according to a change (variation) degree on the time axis, and snowfall information and rainfall information are stored in a dynamic information layer because they have largest change and need to be updated in real time. The global dynamic map is a map necessary for autonomous traveling of a vehicle capable of traveling by the automatic driving, which will be described later.

The cloud server 1 distributes information necessary for automatic driving to a vehicle capable of traveling by the automatic driving via the base station 3. In the embodiment, a vehicle (own vehicle) M on which a driver (driver during manual driving) gets on will be described as a vehicle that is capable of traveling by automatic driving.

The own vehicle M is equipped with a driving assist unit 21 for causing the own vehicle to travel autonomously without being operated by the driver in an automatic driving section. The driving assist unit 21 includes a locator unit 22 and an automatic driving control unit 23 as an automatic driving controller, and the locator unit 22 is provided with a road information transceiver 22a and a GNSS receiver 22b. The locator unit 22 estimates the own vehicle position based on positional signals received by the GNSS receiver 22b from a plurality of positioning satellites.

The locator unit 22 accesses the cloud server 1 via the base station 3 and the Internet 5 from the road information transceiver 22a to acquire road information and map information stored in the global dynamic map. The locator unit 22 map-matches the own vehicle position on a map based on map information received by the road information transceiver 22a, and builds a traveling route connecting an inputted destination and the own vehicle position. The locator unit 22 sets a target travel path for executing automatic driving on the built traveling route up to several kilometers ahead of the own vehicle M.

Figure 4:
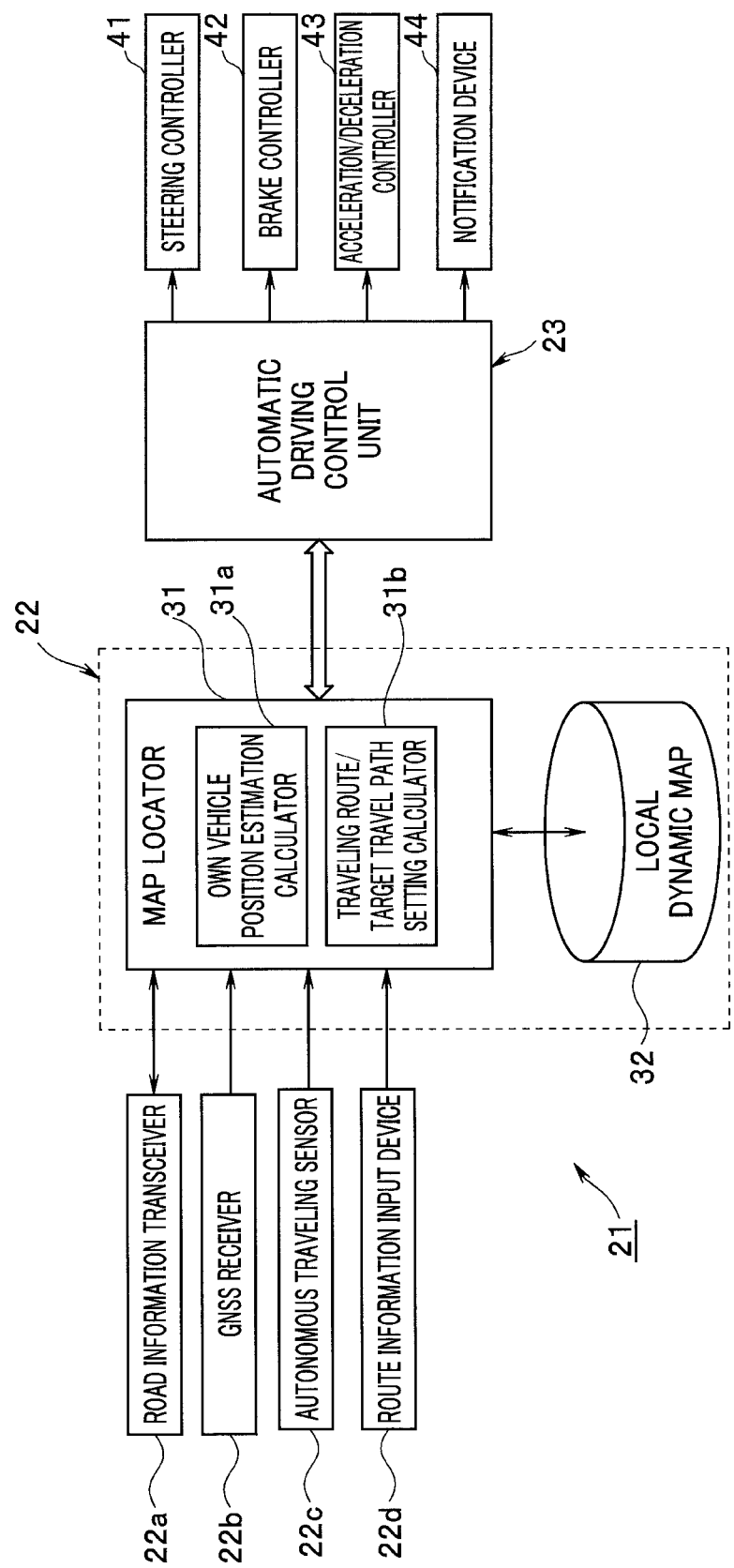
FIG. 4 is a functional block diagram of a driving assist unit mounted on a vehicle.

As illustrated in FIG. 4, the locator unit 22 of the driving assist unit 21 mounted on the own vehicle M includes a map locator calculator 31, and a high-accuracy road map database 32 as a storage unit. The map locator calculator 31 and an automatic driving control unit 23 are constituted of a well-known microcomputer including a CPU, a RAM, a ROM, a non-volatile storage unit and the like, and peripheral devices thereof, and programs to be executed by the CPU, fixed data such as data tables, and the like are stored in the ROM in advance.

In addition to the above-described road information transceiver 22a and the GNSS receiver 22b, an autonomous traveling sensor 22c and a route information input device 22d are coupled to the input side of the map locator calculator 31. The autonomous traveling sensor 22c enables autonomous traveling in an environment where reception sensitivity from the GNSS satellite is low and a positional signal cannot be effectively received, such as traveling in a tunnel, and is constituted of a vehicle speed sensor, a yaw rate sensor, a longitudinal acceleration sensor, and the like.

The route information input device 22d is a terminal device operated by an occupant (mainly a driver). That is, the route information input device 22d can receive an intensive input of a series of information necessary for setting the traveling route in the map locator calculator 31 such as setting of a destination and a waypoint and an ON of the automatic driving. Specifically, the route information input device 22d is a car navigation system input unit (for instance, a monitor touch panel), a portable terminal such as a smartphone, a personal computer, or the like, and is coupled to the map locator calculator 31 by wire or wirelessly.

When an occupant operates the route information input device 22d to input information on a destination and a waypoint (facility name, address, telephone number, and the like), the input information is read by the map locator calculator 31.

When the destination and the waypoint are inputted, the map locator calculator 31 sets the position coordinates (latitude and longitude). The map locator calculator 31 includes an own vehicle position estimation calculator 31a for estimating the own vehicle position and a traveling route/target travel path setting calculator 31b for setting a traveling route from the own vehicle position to a destination (and a waypoint), and a target travel path along which the own vehicle M is caused to travel automatically in the automatic driving section.

The high-accuracy road map database 32 is a large-capacity storage medium such as an HDD, and stores therein well-known high-accuracy road map information (local dynamic map). The high-accuracy road map information has the same layer structure as the global dynamic map stored in the map database unit 15 included in the cloud server 1, and the static information of the lowermost layer serving as the base is common. Additional map information necessary for assisting automatic traveling is superimposed on the lowest static information layer of the high-accuracy road map information. The additional map information is sequentially uploaded by acquiring necessary peripheral information from the global dynamic map when the traveling route is set.

The own vehicle position estimation calculator 31a acquires current position coordinates (latitude and longitude) of the own vehicle M based on a positional signal received by the GNSS receiver 22b and map-matches the position coordinates on the high-accuracy road map information to estimate the own vehicle position (current position) on the road map.

In an environment where an effective positional signal cannot be received from the positioning satellite due to a decrease in sensitivity of the GNSS receiver 22b such as traveling in a tunnel, the own vehicle position estimation calculator 31a switches to autonomous navigation and acquires a moving distance and azimuth of the own vehicle based on the autonomous traveling sensor 22c (the vehicle speed detected by the vehicle speed sensor, the yaw rate (yaw angular speed) detected by the yaw rate sensor, the longitudinal acceleration detected by the longitudinal acceleration sensor, and the like) to perform localization.

The traveling route/target travel path setting calculator 31b refers to the local dynamic map stored in the high-accuracy road map database 32 based on position information (latitude and longitude) of the own vehicle position estimated by the own vehicle position estimation calculator 31a and position information (latitude and longitude) of the inputted destination (and waypoint). The traveling route/target travel path setting calculator 31b builds a traveling route coupling the own vehicle position and the destination (the destination via the waypoint when the waypoint is set) on the local dynamic map according to a route condition set in advance (recommended route, fastest route, or the like).

A target travel path along which the own vehicle M is caused to travel by automatic driving is set up to several kilometers ahead of the own vehicle M. Items to be set as the target travel path are a lane on which the own vehicle M is caused to travel (for instance, on which of the lanes the own vehicle M is caused to travel in a case of three lanes), a timing for changing the lane when the target travel path is set in the branch road direction, and the like.

The map locator calculator 31 and the automatic driving control unit 23 are coupled to each other via an in-vehicle communication line (for instance, a controller area network (CAN)) so as to be capable of performing bidirectional communication. To the output side of the automatic driving control unit 23, a steering controller 41 configured to control the own vehicle M to travel along the target travel path, a brake controller 42 configured to decelerate the own vehicle M by using a forced brake, an acceleration/deceleration controller 43 configured to control the vehicle speed of the own vehicle M, and a notification device 44 such as a monitor, a speaker, and the like are coupled.

The automatic driving control unit 23 controls the steering controller 41, the brake controller 42, and the acceleration/deceleration controller 43 in a predetermined manner when the target travel path is set, and causes the own vehicle M to automatically travel along a target travel path based on a positional signal indicating the own vehicle position received by the GNSS receiver 22b.

Although not illustrated, an on-board peripheral monitoring sensor such as a camera or a laser scanner is mounted on the own vehicle M. When lane markers marking the left and right of the traveling lane are recognized by the on-board peripheral monitoring sensor, the automatic driving control unit 23 performs driving assist control for guiding the own vehicle M to travel in the center of the traveling lane, and a redundant system is built with the above-mentioned automatic driving control by matching the high-accuracy road map information with the own vehicle position information.

In the region with a lot of snowfall, the area from which snow has been removed becomes a provisional traveling lane. However, the high-accuracy road map information is measured when there is no accumulated snow, and the traveling lane set as the target travel path on the high-accuracy road map does not match the provisional traveling lane formed as a result of snow removal. Moreover, when the provisional traveling lane cannot be recognized by the on-board peripheral monitoring sensor, the target travel path cannot be built. In the embodiment, even under such a situation, a target travel path can be built along a provisional traveling lane.

The road information calculator 14 of the cloud server 1 generates cloud information (snowfall cloud information) at each measurement point P during snowfall based on probe information of the probe vehicles L passing through each measurement point P aggregated by the traffic information acquirer 12 and weather information at each measurement point P aggregated by the weather information acquirer 13.

When detecting the snowfall at the measurement point P, the traveling route/target travel path setting calculator 31b of the map locator calculator 31 reads the travelable width Wt narrowed as a result of snow removal. The travelable width Wt is a substantially travelable vehicle width, and when the travelable width Wt is less than the width of the own vehicle M, it is determined that the vehicle cannot travel. When the travelable width Wt is equal to or larger than the width of the own vehicle M, it is determined that the own vehicle can travel, and the center of the travelable width Wt (Wt/2) is set as a target travel path to continue the automatic driving of the own vehicle M.

Figure 5:
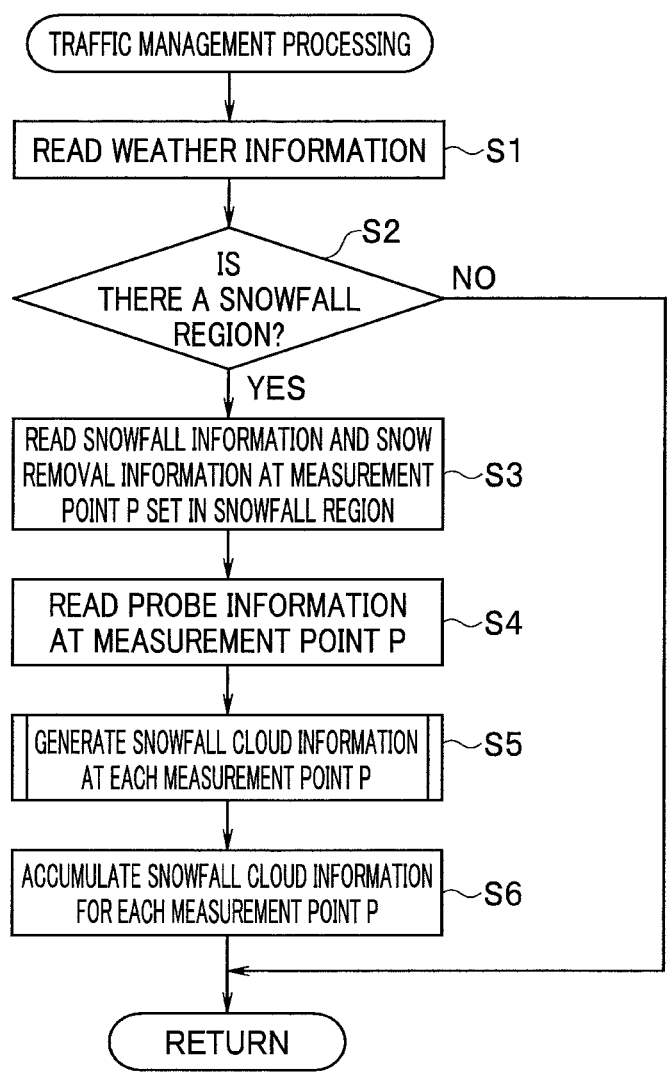
FIG. 5 is a flowchart illustrating a traffic management processing routine executed by a cloud server.

The above-mentioned snowfall cloud information generated by the road information calculator 14 of the cloud server 1 is specifically generated in a traffic management processing routine illustrated in FIG. 5. In the routine, in step S1, weather information is read, and in step S2, it is checked whether there is a snowfall region. When there is no information on the snowfall region, the process exits the routine. When there is information on the snowfall region, the process proceeds to step S3.

In the step S3, snowfall information and snow removal information at the measurement point P set in the snowfall region are read. Then, the process proceeds to step S4, where probe information of the probe vehicles L that have passed through the measurement point P is read.

The process proceeds to step S5, and snowfall cloud information is generated based on the snowfall information and probe information at the measurement point P in the snowfall region. The snowfall cloud information includes a current snowfall amount [cm/h] and an accompanying accumulated snow amount [cm] as weather information of each measurement point P. The probe information at each measurement point P includes probe information of probe vehicles L when snowfall is observed, and past histories of the probe vehicles L that have passed through the measurement point P.

Next, the process proceeds to step S6, where the snowfall cloud information generated in the step S5 is stored in the quasi-dynamic information layer of the measurement point P set in the global dynamic map of the map database unit 15, and the process exits the routine.

The snowfall cloud information is read by the locator unit 22 of the driving assist unit 21 mounted on the own vehicle M.

When the driver gets on the own vehicle M and activates the driving assist unit 21, the own vehicle position estimation calculator 31a of the locator unit 22 acquires the current position coordinates (latitude and longitude) of the own vehicle M based on the positional signal received by the GNSS receiver 22b, and map-matches the position coordinates on the local dynamic map stored in the high-accuracy road map database 32 to estimate the own vehicle position (current position) on the road map.

When the driver operates the route information input device 22d to input the destination, the traveling route/target travel path setting calculator 31b builds a traveling route. During traveling, the target travel path for executing the automatic driving is set up to several kilometers ahead of the own vehicle M on the traveling route.

Figure 6:
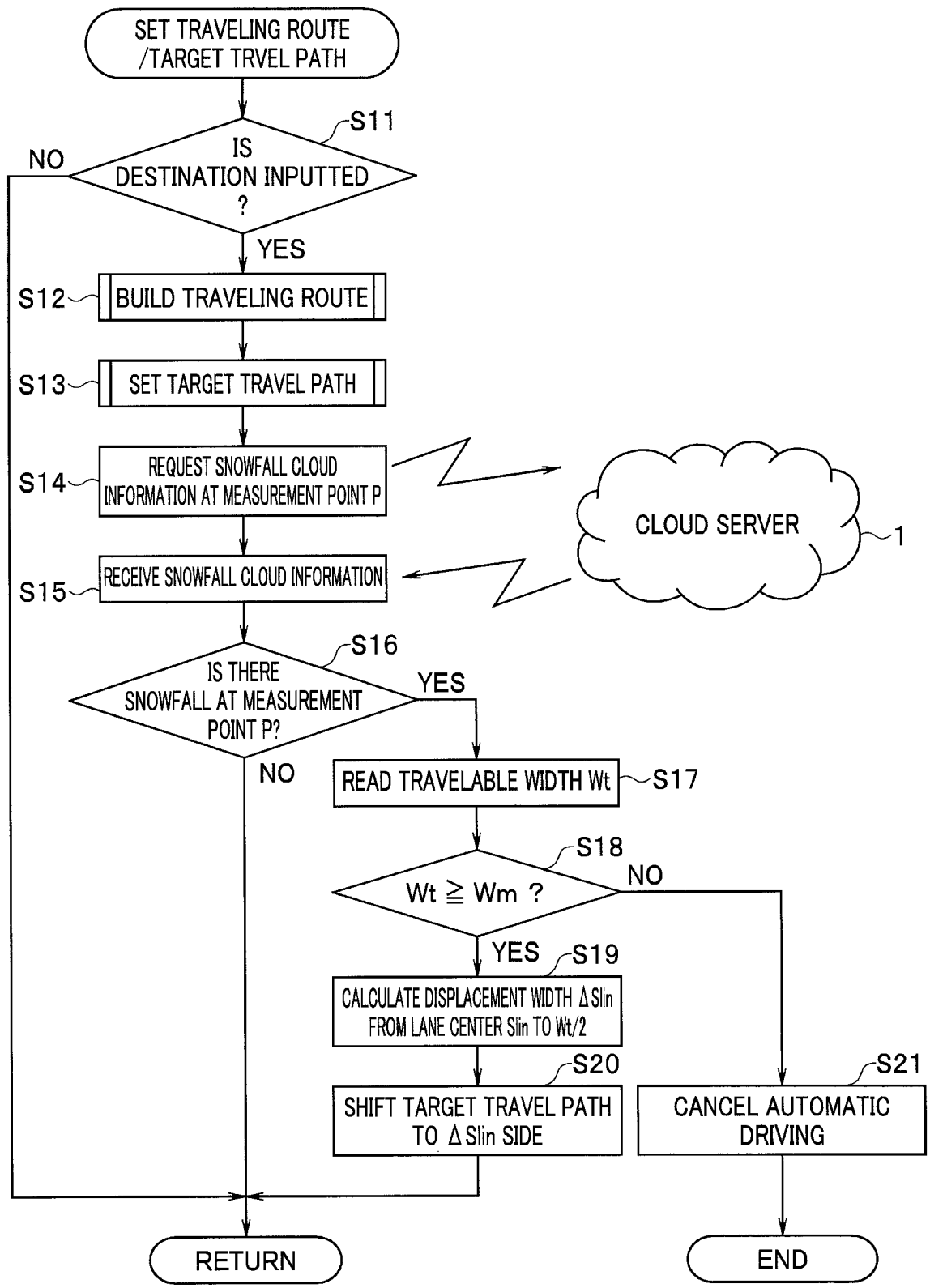
FIG. 6 is a flowchart illustrating a traveling route/target travel path setting routine executed by a driving assist unit.

Setting of the traveling route and the target travel path executed by the traveling route/target travel path setting calculator 31*b* is specifically performed according to the traveling route/target travel path setting routine illustrated in FIG. 6.

In the routine, first, the process waits until a destination is inputted in step S11. When a driver gets on an own vehicle M and operates the route information input device 22*d* to input the destination, the program proceeds to step S12 to map-match the inputted destination on the local dynamic map stored in the high-accuracy road map database 32. A traveling route connecting the current position and the destination is built on the local dynamic map according to preset route conditions (recommended route, fastest route, or the like).

Next, the process proceeds to step S13, where a target travel path is set up to several kilometers ahead of the own vehicle M on the built traveling route. Control conditions necessary for the own vehicle M to travel automatically along the traveling route without being subjected to the driver's operation are set for the target travel path.

The control conditions include, on which of traveling lanes the own vehicle is caused to travel (in a case of three lanes, a first traveling lane, a second traveling lane, or a passing lane), a target route for changing the lane when a traveling lane needs to be changed, and a target route for causing the own vehicle to enter a branch road when the target travel path is set to a branch road (a junction, an exit of an expressway, a bypass road, or the like), and the like. The automatic driving control unit 23, which will be described later, performs steering control and vehicle speed control for causing the own vehicle M to travel along the set target route.

The process proceeds to step S14, and snowfall cloud information at each measurement point P set on the target travel path is requested from the road information transceiver 22*a* to the cloud server 1 via the Internet 5. The measurement point P is set in the static information layer of the local dynamic map for each predetermined section (for instance, several hundred meters).

The process proceeds to step S15, and the snowfall cloud information transmitted from the cloud server 1 is received, and the process proceeds to step S16. In step S16, it is checked whether there is snowfall at the measurement point P set on the target travel path from the snowfall cloud information. In a case where there is no snowfall, the process directly exits the routine. In a case where there is snowfall, the process branches to step S17. In the step S17, a travelable width Wt at the measurement point P stored in the non-volatile storage unit is read. The travelable width Wt is a width for determining whether the own vehicle M can travel when both sides of the traveling lane are gradually narrowed due to snowfall, and is acquired in step S42 of a travelable width setting routine to be described later.

The process proceeds to step S18, where the travelable width Wt is compared with an own-vehicle travelable width Wm. The own vehicle travelable width Wm is a value acquired by adding a margin width α (for instance, 50 [cm], that is 25 [cm] for each left and right) to the vehicle width W, which is registered in advance, of the own vehicle M. When the travelable width Wt is equal to or wider than the own-vehicle travelable width Wm (Wt≥Wm), it is determined that the own vehicle can pass through the measurement point P by the automatic driving, and the process proceeds to step S19. When Wt is narrower than Wm (Wt<Wm), it is determined that the own vehicle is difficult to travel by automatic driving, and the process branches to step S21. Note that the processing in steps S17 and S18 corresponds to the own vehicle traveling possibility determiner of the technology.

Figure 12:
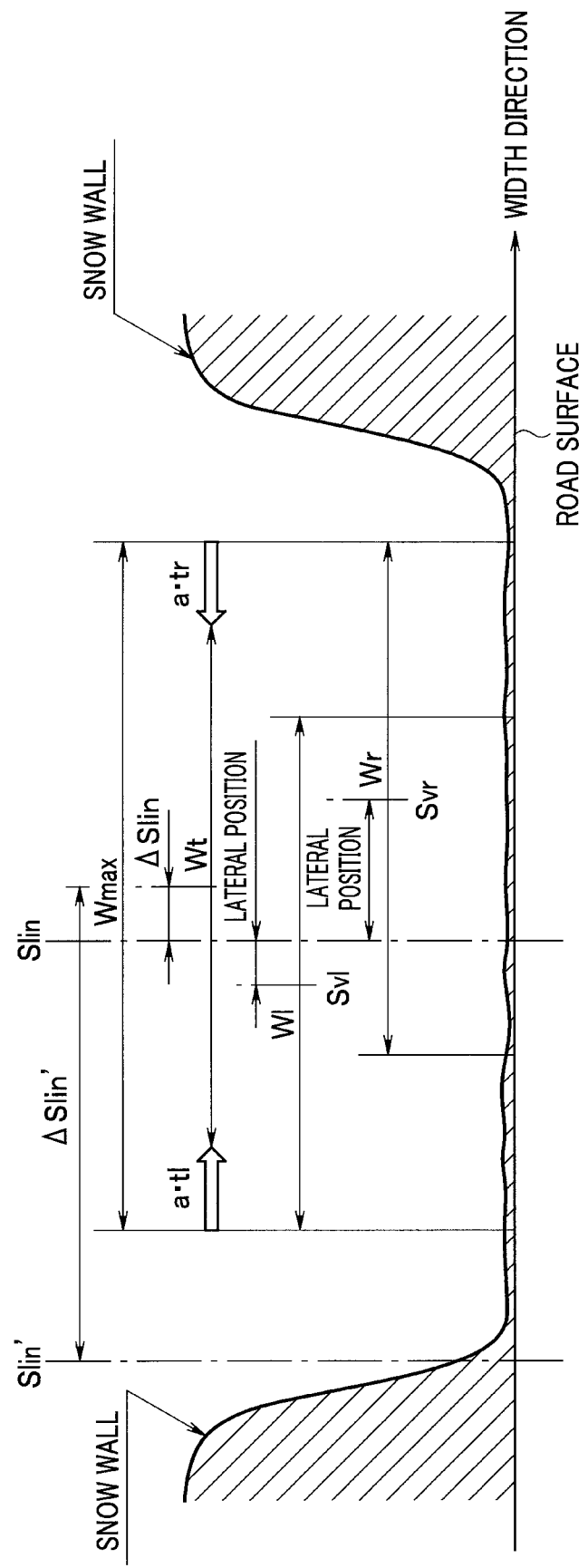
FIG. 12 is an explanatory diagram of a travelable width acquired at the road measurement point.

When the process proceeds to step S19, a displacement width (lateral position) ΔSlin up to half of the travelable width Wt, with the lane center Slin as a reference, is calculated (see FIG. 12). The lane center Slin is stored in the static information layer of the dynamic map, is a center between the lane markers marking the left and right, and is normally set as a target travel path for performing automatic driving on a road surface free from snow. In many cases, the travelable width Wt in a situation where a large amount of snowfall is determined depending on snow removal by a snowplow. Therefore, for instance, when the snowplow first removes snow in a second lane, the center of the travelable width Wt is substantially the center of the second traveling lane. In this case, when the center of the first traveling lane is set as a target travel path as indicated by the reference sign Slin' in FIG. 12, the displacement width becomes ΔSlin'.

The process proceeds to step S20, sets a new target travel path acquired by shifting the target travel path set in the step S13 to the lateral position by the displacement width ΔSlin, and exits the routine. In the embodiment, during the automatic driving, the own vehicle M is controlled to travel, with the center of the own vehicle in the vehicle width direction being along the target travel path.

As will be described later, the travelable width Wt is acquired for each measurement point P. When the measurement point P is set for every several hundred meters, the travelable width Wt does not vary greatly between the nearest measurement point P and the next measurement point P, so that the new target travel path set in the step S20 is maintained until reaching the next measurement point P. Note that the processing of the steps S13 to S20 corresponds to the target travel path setting calculator of the technology.

On the other hand, when the process to step S21, the automatic driving is canceled and shifted to manual driving so that the driver can take over the driving.

Figure 7:
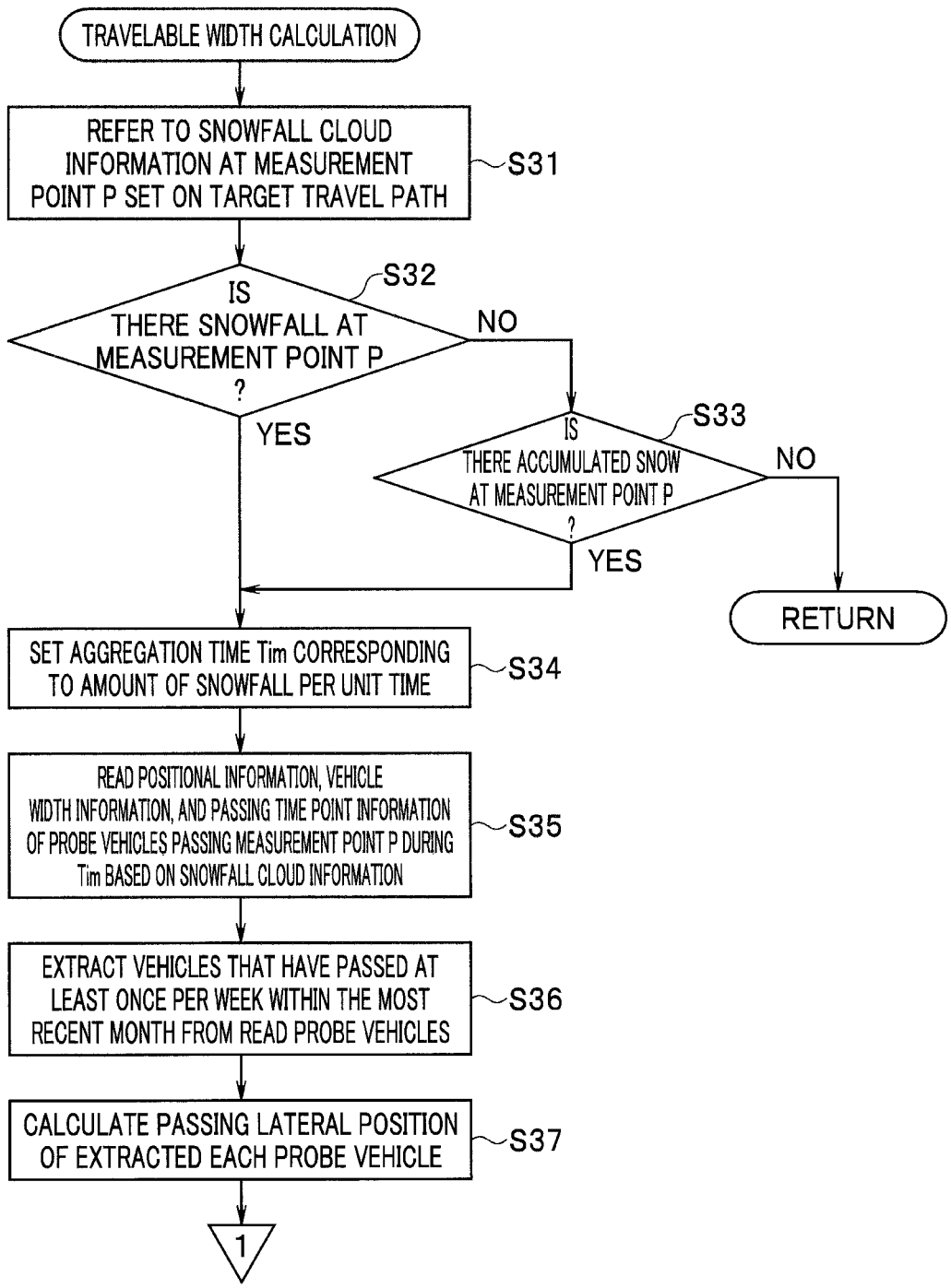
FIG. 7 is a flowchart illustrating a travelable width calculation routine (part 1).
Figure 8:
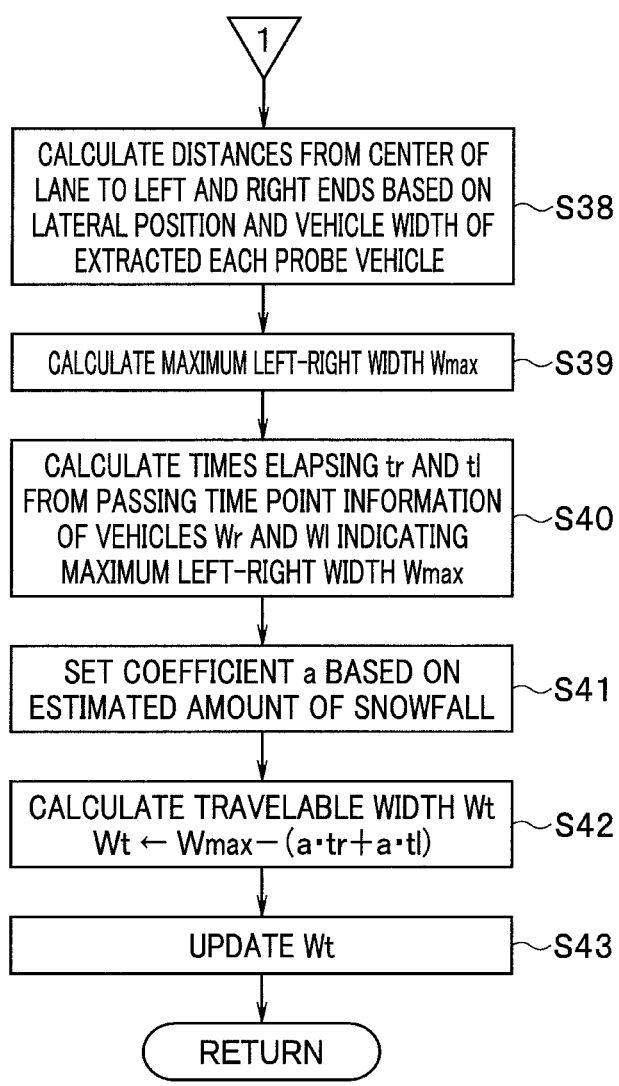
FIG. 8 is a flowchart illustrating a travelable width calculation routine (part 2).

The travelable width Wt described above is calculated in the travelable width calculation routine illustrated in FIG. 7 and FIG. 8. Note that the processing in the routine corresponds to the travelable width calculator of the technology. In the embodiment, the processing in the routine is performed by the traveling route/target travel path setting calculator 31*b*, but may be performed by the road information calculator 14 of the cloud server 1. In the road information calculator 14, the travelable widths Wt are sequentially calculated at the measurement points P set in the snowfall regions of the whole country, and in the above-described step S17, the travelable width Wt of the corresponding measurement point P is read from the cloud server 1.

In the routine, first, in step S31, the snowfall cloud information read in the step S15 of the traveling route/target travel path setting routine described above is referred to. When the routine is executed by the road information calculator 14 of the cloud server 1, the snowfall cloud information set by the road information calculator 14 is referred to.

The process proceeds to step S32, and checks whether the measurement point P is in a snowfall state based on the snowfall cloud information. When it is not in the snowfall state, the process branches to step S33, and when it is in the snowfall state, the process proceeds to step S34. When the process branches to step S33, it is checked based on the snowfall cloud information whether there is accumulated snow at the measurement point P, and when there is accumulated snow, the process proceeds to step S34, and when there is no accumulated snow, it is determined that the vehicle can travel normally, and the process exits the routine.

When it is determined that the measurement point P is in a snowfall state or there is accumulated snow, and the process proceeds to step S34, an aggregation time Tim corresponding to the amount of snowfall per unit time is set. The aggregation time Tim is a time period acquired by setting how far going back for the aggregation from the time point when the own vehicle M is expected to pass the measurement point P when aggregating the information of the probe vehicles L that have passed the measurement point P. When an amount of snowfall is large, an amount of accumulated snow on the road increases every moment, so that it is necessary to acquire the travelable width Wt from the latest information. On the other hand, when there is no snowfall and accumulated snow remains on the road, it is possible to acquire the travelable width Wt with high precision by aggregating the probe information preceding considerably in time (past).

Accordingly, the aggregation time Tim is set to be gradually shorter when the amount of snowfall per unit time is large, and is set to be longer when the amount of snowfall is small. For instance, when the amount of snowfall is zero, the maximum time is set to two hours, and when the amount of snowfall is large, the upper limit time is set to 30 minutes, and the aggregation time is proportionally set between the maximum time and the upper limit time in accordance with the amount of snowfall.

The process proceeds to step S35, the passing lateral information (latitude and longitude), the vehicle width information, and the passing time point information of the probe vehicles L are read based on the probe information of the probe vehicles L that have passed through the measurement point P during a period from a time point back from the current time point by the aggregation time Tim until the current time point based on the snowfall cloud information.

The process proceeds to step S36, where the reliability of each read probe vehicle L is checked, and probe information of the probe vehicles L having high reliability is extracted. Specifically, based on a vehicle ID and a passing date and time of the measurement point P included in the probe information of the probe vehicle L, the probe information of the probe vehicles L that have passed the measurement point P at least once per week within the most recent month is extracted as highly reliable information. It is considered that the probe vehicles L having a high frequency of passing through the road on which the measurement point P is set, such as local vehicles, are relatively familiar with the driving operation at the time of snowfall, and it can be estimated that the probe vehicles select the proper travel line, so that it is considered to be the probe information with high reliability. It should be noted that the extraction condition of the most recent month and at least once per week is an instance, and is not limited to this.

After that, the process proceeds to step S37, and a passing lateral position (latitude and longitude) of the probe vehicle L, with the lane center Slin as the reference is acquired based on position information (latitude and longitude) when passing through the measurement point P included in the probe information of each probe vehicle L extracted, and the position information (latitude and longitude) indicating a lane center Slin (see FIG. 12) of the traveling lane (for instance, a first traveling lane in a case of two traveling lanes) which is normally set as a target travel path during automatic driving at the measurement point P stored in the local dynamic map. The lateral position is a deviation width between the position coordinates of the lane center Slin set in the local dynamic map and the position coordinates of the center Sv (Svl, Svr in FIG. 12) of the probe vehicle L in the vehicle width direction.

The process proceeds to step S38, and based on the lateral position and an own vehicle width W (Wl, Wr in FIG. 12) of each probe vehicle L, the distance from the lane center Slin of the traveling lane normally set as the target travel path to the position (latitude and longitude) indicating the left and right ends of the own vehicle width W of each probe vehicle L is acquired.

Then, the process proceeds to step S39, and a maximum width Wmax between the left end and right end (maximum left-right width) of each probe vehicle L is acquired (see FIG. 12). The process proceeds to step S40, and based on passing time point information of the probe vehicles Ll and Lr (see FIG. 10 and FIG. 11) indicating the maximum left-right width Wmax, times elapsing tl and tr from the time point when the probe vehicles Ll and Lr have passed the measurement point P to the time point when the own vehicle M passes through the measurement point P are acquired.

The time point at which the own vehicle M passes through the measurement point P can be easily predicted from the own vehicle speed and the distance to the measurement point P (route distance). When the amount of snowfall is large, the maximum left-right width Wmax gradually decreases over time. For instance, as illustrated in FIG. 10, when the amount of accumulated snow on a road surface is relatively small, or when there is no snowfall presently but snow walls are formed on both sides by the previous snowfall, the traveling vehicle is able to travel at a relatively free position within the lane markers, so that the maximum left-right width Wmax is wide.

On the other hand, as illustrated in FIG. 11, when there is snowfall, the left and right snow walls intrude in the direction of the traveling lane due to snow removal, flying splashes when the vehicle is traveling, and the like, so that the maximum left-right width Wmax becomes gradually narrower. The times elapsing tl and tr are acquired in consideration of the change over time. However, since the times passing through the measurement point P of the probe vehicles Ll and Lr indicating the maximum left-right width Wmax are different, the times elapsing tl and tr are individually acquired.

The process proceeds to step S41, and a coefficient a is set based on expected amount of snowfall when the own vehicle M passes through the measurement point P, which is acquired from the snowfall cloud information. The maximum left-right width Wmax varies, since the intrusion degree of the snow wall varies depending not only on the times elapsing tl and tr during snowfall but also on the amount of snowfall. The coefficient a is set to a value substantially proportional to the expected amount of snowfall, is set to 0 when there is no snowfall, is increased in proportion to the expected amount of snowfall, and becomes a constant value at a preset limit expected amount of snowfall.

The process proceeds to step S42, where the travelable width Wt of the own vehicle M is calculated from the following formulation.

$$Wt \leftarrow Wmax - (a \cdot tl + a \cdot tr)$$

Accordingly, as illustrated in FIG. 12, the larger the difference between the transmission time point of the probe information transmitted when the probe vehicle Ll and Lr indicating the maximum left-right width Wmax have passed through the measurement point P and the time point at which the own vehicle M is expected to pass, the narrower the travelable width Wt.

The process proceeds to step S43, where the travelable width Wt at the measurement point P stored in the non-volatile storage unit is updated, and the process exits the routine. Therefore, the travelable width Wt at the measurement point P is sequentially updated to the latest value until the own vehicle M passes through the measurement point P.

Figure 9:
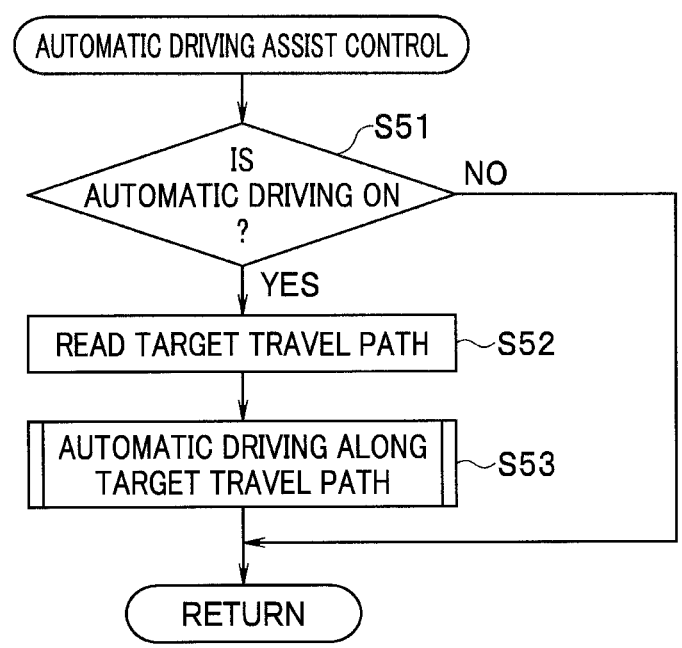
FIG. 9 is a flowchart illustrating an automatic driving assist control routine executed by a driving assist unit.

The automatic driving control unit 23 controls each of controllers 41 to 43 so that the own vehicle M at the own vehicle position estimated by the own vehicle position estimation calculator 31a automatically travels at a predetermined speed on a target travel path set by the traveling route/target travel path setting calculator 31b. Specifically, automatic driving is executed according to the automatic driving assist control routine illustrated in FIG. 9.

In the routine, first, in step S51, it is checked whether the automatic driving is ON state. The automatic driving is carried out by operating a display screen of the route information input device 22d. Alternatively, an automatic driving switch may be provided on a steering wheel, and the switch may be used to turn ON/OFF the automatic driving.

When the automatic driving is ON, the process proceeds to step S52, and when the automatic driving is OFF, the process exits the routine. When a destination is set by the map locator calculator 31 even when the automatic driving is OFF, a route to the destination is displayed together with an icon indicating the own vehicle position on a monitor of a car navigation system. When the automatic driving is canceled in step S21 of the traveling route/target travel path setting routine described above, the driver can drive slowly between snow walls formed on the left and right sides by the driver's own steering wheel operation, brake operation, and accelerator operation.

When the automatic driving is determined to be ON and the process proceeds to step S52, the target travel path set in the step S20 of the traveling route/target travel path setting routine is read. The process proceeds to step S53, where each of controllers 41 to 43 is controlled in a predetermined manner so that the own vehicle at the own vehicle position estimated by the own vehicle position estimation calculator 31a of the map locator calculator 31 is caused to be automatically travel along the target travel path, and the process exits the routine. As a result, as illustrated in FIG. 10 and FIG. 11, even when the lane width is narrower than the original traveling lane due to snowy road or snowfall, the own vehicle M can be automatically traveled along the target travel path set in the step S20 of the traveling route/target travel path setting routine described above.

As described above, the cloud server 1 acquires, as the snowfall cloud information, the snowfall information and the snow removal information in the region with a lot of snowfall, and probe information acquired from the probe vehicles L passing through the measurement point P set on the road in advance. Based on the snowfall cloud information, the target travel path of the own vehicle M is shifted by a predetermined displacement width ΔSlin from the normal lane center Slin, so that an appropriate target travel path corresponding to the accumulated snow situation and the snow removal situation can be set.

As a result, even in a situation where the on-board peripheral monitoring sensor cannot be used due to snowfall or strong wind in the region with a lot of snowfall, when the own vehicle position can be estimated based on the positional signal from the positioning satellite, the automatic driving can be continued with the own vehicle position and the target travel path set based on the high-accuracy road map information, and the burden on the driver can be greatly reduced.

Note that the technology is not limited to the above-described embodiment, and for instance, in a case of automatic driving, information of a preceding vehicle may be acquired by vehicle-to-vehicle communication or road-to-vehicle communication, so that vehicle speed control and inter-vehicle distance control may be performed.

As illustrated in FIG. 1, the locator unit 22 and the automatic driving control unit 23 mounted on the own vehicle M can be implemented by the afore-mentioned microcomputer, and also by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the locator unit 22 and the automatic driving control unit 23 mounted on the own vehicle M. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 1.

Although some embodiments of the technology have been described in the foregoing by way of instance with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

As described above, according to the embodiment of technology, during the predetermined aggregation time period from a predetermined time point until the time point when own vehicle is expected to pass through the measurement point set in advance, the position information and the vehicle width information of the preceding vehicles which have passed through the measurement point are aggregated to acquire the travelable width, and when the travelable width is equal to or larger than the own-vehicle travelable width of the own vehicle, the own vehicle is caused to travel through the measurement point by automatic driving. Therefore, even in a situation where the on-board peripheral monitoring sensor cannot be used due to snowfall or strong wind in the region with a lot of snowfall, it is possible to reduce the burden on the driver by appropriately determining whether the own vehicle can pass through and continuing the automatic driving.

The invention claimed is:
1. An automatic driving assist system comprising:
 a server configured to communicate with vehicles that include an own vehicle and a probe vehicles;
 a traveling environment information acquirer configured to acquire weather information at a measurement point set on a road to be traveled by an own vehicle, the measurement point including a snow-removed area in a snowfall region on the road, the weather information including snow removal information at the snow-removed area in the snowfall region on the road;

a traveling information acquirer configured to acquire probe information, the probe information being transmitted from the probe vehicles that passed through the snow-removed area of the measurement point to the server, the probe information including i) vehicle width information of the probe vehicles, ii) passing date and time of when the probe vehicles passed the measurement point, and iii) position information of the probe vehicles on the road when the probe vehicles passed the measurement point;

a travelable width calculator configured to calculate a travelable width of the snow-removed area of the measurement point based on i) the weather information including the snow removal information and ii) the probe information; and an own vehicle traveling possibility determiner configured to determine whether the own vehicle is capable of passing through the snow-removed area of the measurement point by automatic driving based on comparing the calculated travelable width with an own-vehicle travelable width of the own vehicle, wherein the own vehicle comprises:
a target travel path setting calculator that sets a target travel path along which the own vehicle is caused to travel automatically; and
an automatic driving controller that causes the own vehicle to automatically travel along the target travel path, wherein when the own vehicle traveling possibility determiner determines that the own vehicle is not capable of passing through the measurement point by the automatic driving, the automatic driving controller cancel the automatic driving before the own vehicle reaches the measurement point, wherein the weather information indicates a snowfall amount per unit time at the measurement point at a current time point, wherein the travelable width calculator is configured to:
aggregate the probe information of the probe vehicles that passed the measurement point during a time period between the current time point and a start time point, the start time point being a timepoint before the current time point by an aggregation time, the probe vehicles including a first vehicle and a second vehicle different from the first vehicle, the first vehicle being a vehicle with a left end passed at a most left side at the measurement point during the time period among the probe vehicles, the second vehicle being a vehicle with a right end passed a most right side at the measurement point during the time period among the probe vehicles;

calculate a distance between a position of the left end of the first vehicle at the measurement point and a position of the right end of the second vehicle at the measurement point based on a first probe information transmitted from the first vehicle and a second probe information transmitted from the second vehicle; and calculate the travelable width based on the distance, and wherein the travelable width calculator is configured to:
determine whether the snowfall amount per unit time at the measurement point is zero;

in response to determining that a current snowfall amount per unit time at the measurement point is zero, set a predetermined first time longer than zero as the aggregation time; and in response to determining that the current snowfall amount per unit time at the measurement point is not zero, i) calculate a second time so that (a) the second time is shorter than the predetermined first time, (b) the second time is equal to or longer than a predetermined limit time longer than zero, and (c) the second time becomes shorter as the current snowfall amount per unit time at the measurement point becomes larger, and ii) set the calculated second time as the aggregation time.

2. The automatic driving assist system according to claim 1, wherein the travelable width calculator is configured to:
calculate a first elapsed time and a second elapsed time, the first elapsed time being a time from a time point when the first vehicle passed the measurement point to the current time point, the second elapsed time being a time from a time point when the second vehicle passed the measurement point to the current time point;
calculate a first length and a second length based on the first elapsed time and the second elapsed time so that the first length increases as the first elapsed time increases and the second length increases as the second elapsed time increases; and
calculate the travelable width as a value calculated by subtracting the first length and the second length from the distance.

3. The automatic driving assist system according to claim 2, wherein the travelable width calculator is configured to:
calculate the first length as a value calculated by multiplying the first elapsed time by a coefficient;
calculate the second length as a value calculated by multiplying the second elapsed time by the coefficient; and
calculate the coefficient so that the coefficient increases as the current snowfall amount per unit time at the measurement point is larger.

4. An automatic driving assist system comprising a driving assist unit mounted on an own vehicle, the driving assist unit is comprising:
a transceiver configured to communicate with a server that is configured to distribute probe information, the probe information being transmitted from probe vehicles that passed through a measurement point set on a road to the server, the probe information including i) vehicle width information of the probe vehicles, ii) passing date and time of when the probe vehicles passed the measurement point, and iii) position information of the probe vehicles on the road when the probe vehicles passed the measurement point;
an automatic driving controller that causes the own vehicle to automatically travel along a target travel path; and
circuitry configured to:
set the target travel path that passes the road on which the measurement point is set;
receive, from the server via the transceiver, the probe information;
calculate a travelable width of the measurement point based on the received probe information;
determine whether the own vehicle which is under control by the automatic driving controller is capable of passing through the measurement point based on comparing the calculated travelable width with an own-vehicle travelable width of the own vehicle; and in response to a determination that the own vehicle which is under the control by the automatic driving controller is not capable of passing through the measurement point, cancel the control by the automatic driving controller, wherein the circuitry is further configured to:

aggregate the probe information of the probe vehicles that passed the measurement point during a time period between a current time point and a start time point, the start time point being a timepoint before the current time point by an aggregation time, the probe vehicles including a first vehicle and a second vehicle different from the first vehicle, the first vehicle being a vehicle with a left end passed at a most left side at the measurement point during the time period among the probe vehicles, the second vehicle being a vehicle with a right end passed at a most right side at the measurement point during the time period among the probe vehicles;

calculate a distance between a position of the left end of the first vehicle at the measurement point and a position of the right end of the second vehicle at the measurement point based on a first probe information transmitted from the first vehicle and a second probe information transmitted from the second vehicle; and calculate the travelable width based on the distance, and calculate a time point when the own vehicle is expected to pass the measurement point; and calculate the travelable width of the measurement point based on the probe information of the probe vehicles that passed through the measurement point during a time period from the time point when the own vehicle is expected to pass the measurement point until before a predetermined aggregation time, and wherein the circuitry is further configured to:

receive, from the server via the transceiver, weather information that indicates a snowfall amount per unit time at the measurement point at the current time point;

determine whether the snowfall amount per unit time at the measurement point is zero;

in response to determining that a current snowfall amount per unit time at the measurement point is zero, set a predetermined first time longer than zero as the aggregation time; and in response to determining that the current snowfall amount per unit time at the measurement point is not zero, i) calculate a second time so that (a) the second time is shorter than the predetermined first time, (b) the second time is equal to or longer than a predetermined limit time longer than zero, and (c) the second time becomes shorter as the current snowfall amount per unit time at the measurement point becomes larger, and ii) set the calculated second time as the aggregation time.

5. The automatic driving assist system according to claim 1, wherein the first and second vehicles have passed the measurement point at least once per week within a most recent month.

6. The automatic driving assist system according to claim 1, wherein the target travel path setting calculator is configured to set the target travel path to pass through a center of the position of the left end of the first vehicle at the measurement point and the position of the right end of the second vehicle at the measurement point.

7. The automatic driving assist system according to claim 4, wherein the circuitry is configured to:

calculate a first elapsed time and a second elapsed time, the first elapsed time being a time from a time point when the first vehicle passed the measurement point to the current time point, the second elapsed time being a time from a time point when the second vehicle passed the measurement point to the current time point;

calculate a first length and a second length based on the first elapsed time and the second elapsed time so that the first length increases as the first elapsed time increases and the second length increases as the second elapsed time increases; and calculate the travelable width as a value calculated by subtracting the first length and the second length from the distance.

8. The automatic driving assist system according to claim 7, wherein the circuitry is configured to:

calculate the first length as a value calculated by multiplying the first elapsed time by a coefficient;

calculate the second length as a value calculated by multiplying the second elapsed time by the coefficient; and calculate the coefficient so that the coefficient increases as the current snowfall amount per unit time at the measurement point is larger.

9. The automatic driving assist system according to claim 4, wherein the first and second vehicles have passed the measurement point at least once per week within a most recent month.

10. The automatic driving assist system according to claim 4, wherein the circuitry is configured to set the target travel path to pass through a center of the position of the left end of the first vehicle at the measurement point and the position of the right end of the second vehicle at the measurement point.

* * * * *